United States Patent
Nakata

Patent Number: 5,887,260
Date of Patent: Mar. 23, 1999

[54] MOBILE COMMUNICATION APPARATUS, FIXED COMMUNICATON APPARATUS, COMMUNICATION SYSTEM AND COMMUNICATION METHOD

[75] Inventor: Junichi Nakata, Tokyo, Japan

[73] Assignee: Sony Corporation, Tokyo, Japan

[21] Appl. No.: 708,728

[22] Filed: Sep. 5, 1996

[30] Foreign Application Priority Data

Sep. 8, 1995 [JP] Japan .................................. 7-257076

[51] Int. Cl.⁶ ..................................................... H04Q 7/00
[52] U.S. Cl. ........................ 455/436; 455/426; 455/462; 455/552
[58] Field of Search .................................... 455/426, 436, 455/437–439, 552, 553, 561, 509, 514, 516, 517, 524, 525, 62, 462, 463, 464, 465, 550, 443, 100, 101, 103, 114–115, 121

[56] References Cited

U.S. PATENT DOCUMENTS 5,367,558 11/1994 Gillig et al. .............................. 455/552
5,463,674 10/1995 Gillig et al. .............................. 455/552
5,659,598 8/1997 Byrne et al .............................. 455/436
5,724,647 3/1998 Sato ........................................ 455/552

*Primary Examiner*—Doris H. To
*Attorney, Agent, or Firm*—Jay H. Maioli

[57] ABSTRACT

In a mobile communication apparatus, power consumption at the time of waiting can be reduced, and hand-off can be easily performed to other systems. The mobile communication apparatus is provided with a memory part (32) which memorizes a selection signal of the first fixed communication apparatus for selecting the first fixed communication apparatuses, the signal being obtained by receiving a signal transmitted from the first fixed communication apparatuses when a hand-off is performed between the first and second fixed communication apparatuses; a comparing part (33) for comparing a memorized selection signal of said first fixed communication apparatuses with a newly received selection signal of the first fixed communication apparatus; and a hand-off process part (31) for performing hand-off to a second fixed communication apparatus from said first fixed communication apparatus in accordance with the comparison result. Thus, hand-off can be easily performed to second fixed communication apparatus, and power consumption during the waiting time can be reduced.

20 Claims, 9 Drawing Sheets

MOBILE COMMUNICATION APPARATUS, FIXED COMMUNICATON APPARATUS, COMMUNICATION SYSTEM AND COMMUNICATION METHOD

BACKGROUND OF THE INVENTION

1. Field of the Invention

This invention related to a mobile communication apparatus, a fixed communication apparatus, a communication system and a communication method, and more particularly, is applicable to a mobile communication apparatus which can be used both in a cellular system which is called Personal Communication Service (PCS) proposed in the United States and a Home Base Station (hereinafter, referred to as a HBS) which corresponds to a base unit of a cordless telephone system for a home or a office.

2. Description of the Related Art

Heretofore, a cellular system called a PCS system has been proposed in the United States. As shown in FIG. 1, this PCS system is roughly composed of a PCS terminal equipment and a plurality of PCS base station apparatuses, and constitutes a broad-band communication system.

The PCS terminal equipments 1A to 1C conduct radio communication with the PCS base station apparatus 2A or 2B in order to conduct in sound communication with general telephones and other portable telephones via a wire circuit and a wireless circuit which are connected to the PCS base station apparatus 2A or 2B.

The PCS base station apparatuses 2A and 2B transmit and receive electric waves by a predetermined radio communication method to mediate calling from the PCS terminal equipment 1A to 1C and the receipt of calls at the PCS terminal equipment 1A through 1C. In addition, the PCS base station apparatuses 2A and 2B regularly transmit the identification signal of their own stations as well as an adjacent station signal which is an identification signal of adjacent PCS base station apparatuses so that the PCS terminal equipment 1A to 1C can identify the base station apparatuses. However, since the PCS base station apparatuses 2A and 2B are different from their own systems even if HBS 4 are located in the vicinity thereof, adjacent base signals concerning the HBS 4 are not transmitted.

Incidentally, service areas 3A and 3B shown in the drawings, show geographical areas which are capable of communicating with the PCS base station apparatuses 2A and 2B. In FIG. 1, since the PCS terminal equipment 1A is located in the service area 3A, the PCS terminal equipment 1A communicates by radio with the PCS base station apparatus 2A. On the other hand, since the PCS terminal equipment 1B is located both in service areas 3A and 3B, the PCS terminal equipment 1B communicates by radio with one of the PCS base station apparatus 2A or 2B. On the other hand, since the PCS terminal equipment 1C is located in the service area 3B, the PCS terminal equipment 1C communicates by radio with the PCS base station apparatus 2B.

On the other hand, the HBS 4 corresponds to a base unit of a cordless telephone system which is set up in a home or office. The HBS 4 enables sound communication between other telephones and the PCS terminal equipment via a wire circuit which is connected to itself, by radio communication with the PCS terminal equipment in the place of the PCS base station apparatus. In other words, the HBS 4 constitutes a cordless telephone system, a closed-band communication system together with the PCS terminal equipment. In such a case, the HBS 4 transmits an identification signal either in a periodic manner or in accordance with the demand from the PCS terminal equipment so that the PCS terminal equipment can identify the HBS 4.

Generally, the telephone charge of the wireless circuit which passes through the PCS base station apparatus is higher than that of the wire circuit. For this purpose, it is considered that a HBS 4 is set up in each home or the like and the HBS 4 is used without using the PCS base station apparatus at home to reduce the telephone charge. There is a possibility that more than one thousand HBS 4 may be located in one service area of the PCS base station apparatus because such HBS 4 are set up in many homes.

Note that, the HBS communication area 5A shown in the drawings, shows a geographical area which is capable of communicating with the HBS 4. This HBS communication area 5A is generally narrow, and may be included in a service area of the PCS base station apparatus as shown in FIG. 1.

Incidentally, the PCS terminal equipment generally moves. When the PCS terminal equipment moves out of the service area of the PCS base station apparatus which is currently communicated as a result of the movement, the PCS terminal equipment should be changed to communicate with another PCS base station apparatus. Generally, the change of such service area is referred to as hand-off.

Here, this hand-off will be explained below. For example, in FIG. 1, a case is considered in which the PCS terminal equipment 1B moves from the inside of the service area 3A of the PCS base station apparatus 2A to the inside of the service area 3B of the PCS base station apparatus 2B. At this time, the PCS terminal equipment 1B cannot communicate with the PCS base station apparatus 2A, so that the communication partner must be changed to the PCS base station apparatus 2B.

In this case, the PCS terminal equipment 1B receives the signal of an adjacent station together with an identification signal of the PCS base station apparatus 2A by receiving a signal which is transmitted from the PCS base station apparatus 2A when the PCS terminal equipment 1B is located in the service area 3A. When the electric wave of the PCS base station apparatus 2A is weakened, the PCS terminal equipment 1B investigates the receiving sensitivity of the PCS base station apparatus 2B which is included in the signal of the adjacent station for the hand-off. While communicating with the PCS base station apparatus 2A, the PCS terminal equipment 1B investigates the receiving sensitivity of the PCS base station apparatus 2B by intermittently receiving the electric wave of the PCS base station apparatus 2B. As a result, when the electric wave of the PCS base station apparatus 2B is sufficiently strong enough to be received, the PCS terminal equipment 1B transmits a hand-off demand to the PCS base station apparatus 2A.

The PCS base station apparatus 2A, which has received this hand-off demand, notifies the controller (not shown) which commands the PCS base station apparatuses 2A and 2B of the generation of the hand-off demand. Then when the controller provides a response, the PCS base station apparatus 2A transmits a hand-off instruction to the PCS terminal equipment 1B. The PCS terminal equipment 1B, which has received this instruction, performs the hand-off from the PCS base station apparatus 2A to the PCS base station apparatus 2B. After performing the hand-off, the PCS terminal equipment 1B confirms that the hand-off can be correctly performed with an identification signal of the PCS base station apparatus 2B which is included in the received signal.

In contrast, for example, when a user who possesses the PCS terminal equipment 1A returns home (that is, when the PCS terminal equipment 1A comes into the HBS communication area 5A), it is required that the PCS terminal equipment 1A is handed-off from the PCS base station apparatus 2A to the HBS 4. Besides, in the same manner, when the user leaves home with the PCS terminal equipment 1A in his hands (that is, the PCS terminal equipment 1A is out of the HBS communication area 5A), it is required that the PCS terminal equipment 1A is handed-off from the HBS 4 to the PCS base station apparatus 2A or 2B.

Incidentally, the PCS base station apparatuses 2A and 2B do not transmit an adjacent station signal with respect to the HBS 4, which is different from its own system. Therefore, when the PCS terminal equipment 1A hands-off, for example, from the PCS base station apparatus 2A to the HBS 4, it is necessary to investigate intermittently whether a signal from the HBS 4 can be received or not during communication with the PCS base station apparatus 2A in order to examine whether hand-off can be performed or not. As a result, when it can be detected that a hand-off can be performed with respect to the HBS 4, the PCS terminal equipment 1A performs a hand-off. After performing the hand-off, the PCS terminal equipment 1A confirms that a hand-off can be correctly performed with an identification signal of the HBS 4 which is included in the received signal.

In this manner, the PCS system performs hand-off control so that the PCS terminal equipments 1A to 1C can move between service areas of the PCS base station apparatuses 2A and 2B. However, such hand-off control that the PCS terminal equipment 1A to 1C can move between the service areas 3A and 3B of the PCS base station apparatuses 2A and 2B and the HBS communication area 5B is not performed. This is because the HBS 4 which is different from its own system is not controlled.

A structure for each of these apparatuses will be explained by using FIGS. 2 and 3. However, for the sake of convenience, a communication system comprising any number of PCS terminal equipments and PCS base station apparatuses is referred to as a PCS communication system. A communication system comprising any number of HBS terminal equipment including the PCS terminal equipment and an HBS is referred to as an HBS communication system.

In the beginning, as shown in FIG. 2, a PCS terminal equipment 1 roughly is comprised of a controller 11 for performing overall control with respect to the sending and receiving of information, a PCS communication part 12 for communicating with the PCS base station apparatus, an HBS communication part 13 for communicating with the HBS 4, a hand-off processing part 14 for performing hand-off process, a switch 15 which is operated by a user, and an antenna 16 for sending and receiving information.

When such PCS terminal equipment 1 communicates with the PCS base station apparatus, the controller 11 controls the PCS communication part 12 in the beginning. The PCS communication part 12, which has received the control, performs appropriate sending and receiving process to the PCS base station apparatus via the antenna 16. On the other hand, in the waiting state, the controller 11 regularly activates the PCS communication part 12 so that a signal from the PCS base station apparatus can be received.

In addition, when the PCS terminal equipment 1 communicates with the HBS 4, the controller 11 controls the HBS communication part 13 in the beginning. The HBS communication part 13, which has received the control, performs appropriate sending and receiving process to the HBS 4 via the antenna 16. On the other hand, in the waiting state, the controller 11 regularly activates the HBS communication part 13 so that a signal from the HBS 4 can be received.

The hand-off processing part 14 grasps a communication partner which is currently in a communication state to perform a hand-off process in accordance with a signal receiving state which is supplied from the controller 11.

For example, when the current communicating system is a PCS communication system, the hand-off process part 14 intermittently monitors the signal receiving state of the HBS 4 to examine whether or not a hand-off can be performed to the HBS communication system. In other words, the hand-off process part 14 suspends the PCS communication part 12 via the controller 11, and activates the HBS communication part 13. The HBS communication part 13 receives the electric waves of the HBS 4 via the antenna 16 to provide the received result to the controller 11. The controller 11, which has received this result, provides to the hand-off process part 14 the signal receiving state showing whether or not the signal of the HBS 4 is being correctly received. The hand-off process part 14 judges whether the signal receiving state of the HBS 4 is in an appropriate range or not. If the state is in the appropriate range, a hand-off is performed from the PCS base station apparatus to the HBS 4 by continuing communication with HBS 4. If the state is not in an appropriate range, the hand-off process part 14 suspends the HBS communication part 13 and activates the PCS communication part 12 again, in order to return to the communication state with the PCS base station apparatus.

On the other hand, when the current communicating system is an HBS communication system, if a signal receiving state obtained via the HBS communication part 13 worsens, the hand-off process part 14 performs a hand-off from the HBS 4 to the PCS base station apparatus when the signal receiving state obtained via the HBS communication part 13 worsens. That is, the hand-off process part 14 suspends the HBS communication part 13 via the controller 11 and activates the PCS communication part 12. The PCS communication part 12 receives the electric wave of the PCS base station apparatus via an antenna 16 and provides the received result to the controller 11. The controller 11, which has received the result, provides a signal receiving state showing whether or not the signal of the PCS base station apparatus is being correctly received to the hand-off process part 14. The hand-off process part 14 judges whether or not the signal receiving state of the PCS base station apparatus is in an appropriate range. If the state is in the appropriate range, the hand-off process part 14 performs a hand-off from the HBS 4 to the PCS base station apparatus by continuing communication with the PCS base station apparatus. If the state is not in an appropriate range, the PCS communication part 12 and the HBS communication part 13 are intermittently operated alternately to perform a hand-off to a system which has accomplished an appropriate receiving operation.

In this manner, the PCS terminal equipment 1 automatically performs a hand-off by monitoring the received state by the hand-off process part 14. In addition, the PCS terminal equipment 1 provides a switch 15 for manual operation. Thereby, a user can directly instruct the start of the hand-off by operating the switch 15. For example, if a user operates this switch 15 when the user that has the PCS terminal equipment 1 returns home or leaves home, the hand-off process part 14 receives this switch operation and starts the hand-off process.

On the other hand, as shown in FIG. 3, the PCS base station device 2 is roughly comprised of a controller 21 for performing an overall control with respect to the sending and receiving of information, a transmitting part 22 for transmitting a signal to the PCS terminal equipment 1, a receiving part 23 for receiving a signal from the PCS terminal equipment 1, a hand-off controller 24 for performing hand-off process, and an antenna 25 for sending and receiving information.

When such PCS base station apparatus 2 communicates PCS terminal equipment 1, the controller 21 controls the transmitting part 22 and the receiving part 23 in the beginning, and activates the transmitting part 22 and the receiving part 23. The transmitting part 22, which has received the control, transmits information obtained from the controller 21 with respect to the PCS terminal equipment 1 in a predetermined communication mode. In addition, the receiving part 23 receives information obtained from the PCS terminal equipment 1 in a predetermined communication mode to provide the information to the controller 21.

The hand-off controller 24 grasps the PCS terminal equipment 1 which is located in its own service area in order to control when the PCS terminal equipment 1 performs a hand-off to another service area. For example, when the PCS terminal equipment 1 which is located in its own service area generates a hand-off demand because the signal receiving state has worsened, the hand-off controller 24 requests a hand-off to another service area of the PCS terminal equipment 1 with respect to the controller (not shown) which commands all the PCS base station apparatuses 2. When receiving a hand-off instruction from the controller as a response, the hand-off controller 24 controls the transmitting part 22 via the controller 21 to transmit a hand-off instruction to the PCS terminal equipment 1. Thereby, the PCS terminal equipment 1 performs a hand-off to another service area.

By the way, when the PCS terminal equipment 1 is about to perform a hand-off to the HBS 4, the hand-off controller 24 does not perform the process even if the hand-off controller 24 receives a hand-off demand from the PCS terminal equipment 1, and it does not provide a hand-off instruction to the PCS terminal equipment 1. This is because the HBS system is different from its own system, as described above, so that the HBS 4 is not controlled.

On the other hand, in general, the controller 21 regularly transmits an identification signal so that the PCS terminal equipment 1, which is located in its own service area, can identify the PCS base station apparatus 2 and transmits an adjacent station signal which is an identification signal of the adjacent PCS base station apparatus 2 for hand-off. However, the controller 21 does not transmit an adjacent station signal with respect to the HBS 4. This is because that the HBS 4 is different from its own system, in the same manner as described above, so that the HBS 4 is not controlled.

For this reason, the PCS terminal equipment 1 regularly searches for the HBS 4 on its own as described above, and performs hand-off to the HBS 4 when the hand-off is possible.

Now, the PCS terminal equipment 1 automatically performs a hand-off from the PCS base station apparatus 2 to the HBS 4 by monitoring the HBS 4 with the hand-off process part 14, as described above. However, at the waiting time, since the PCS terminal equipment 1 monitors the signal receiving state from the HBS 4 in addition to receive a received signal from the PCS base station apparatus 2, so that the HBS communication part 13 as well as the PCS communication part 12 need to be operated frequently though intermittently. Therefore, there is a problem in that the consumed power of the PCS terminal equipment 1 at the time of waiting increases and the usage time of the driving battery is shortened.

In addition, there is a method by which the user operates the switch 15 to perform hand-off by manual operation. However, this method suffers from a drawback in that the communication occasion is lost when the user fails to operate the switch 15. Thus, this method still has a problem in terms of the usage.

SUMMARY OF THE INVENTION

In view of the foregoing, an object of this invention is to provide a mobile communication apparatus, a fixed communication apparatus, a communication system and a communication method in which the consumed power at the waiting time can be reduced, and in which a hand-off can be performed to another system easily.

The foregoing object and other objects of the invention have been achieved by the provision of a mobile communication apparatus for constructing a broad-band communication system with a plurality of first fixed communication apparatuses and for constructing a closed-band communication system with a second fixed communication apparatus which is different from the first fixed communication apparatuses, wherein: a selection signal of the first fixed communication apparatus for selecting the first fixed communication apparatus is memorized, said signal being obtained by receiving a signal transmitted from the first fixed communication apparatus when a hand-off is performed between the first and the second fixed communication apparatuses; the selection signal of the first fixed communication apparatus that has been memorized is compared with the selection signal of the first fixed communication apparatus that is newly received; and hand-off is performed from the first fixed communication apparatus to the second fixed communication apparatus in accordance with the obtained comparison result. By doing so, even when the mobile communication apparatus is not controlled so as to be capable of performing hand-off to the second fixed communication apparatus with the first fixed communication apparatus, hand-off can be performed to the second fixed communication apparatus quite easily. Further, by doing so, the frequency of examining the signal receiving state by operating the second communication part is reduced, thereby being capable of reducing power consumption during the waiting time.

Further, in the present invention, the selection signal of the second fixed communication apparatus for selecting the second fixed communication apparatus is memorized in advance in order to compare the selection signal of the second fixed communication apparatus that is obtained by receiving a signal transmitted from the second fixed communication apparatus with the selection signal of the second fixed communication apparatus that has been memorized, thereby performing hand-off to the second fixed communication apparatus from the first fixed communication apparatus in accordance with the comparison result and the comparison result of the selection signal of the first fixed communication apparatus. By doing so, hand-off to a second fixed communication apparatus to which hand-off is not allowed can be prevented.

Further, in the present invention, the selection signal of the second fixed communication apparatus is transmitted from the first fixed communication apparatus, and the mobile communication apparatus is allowed to memorize in advance the selection signal of the second fixed communication apparatus for selecting the second fixed communication apparatus in order to compare the selection signal of the second fixed communication apparatus that is obtained by receiving a signal transmitted from the first fixed communication apparatus with the selection signal of the second fixed communication apparatus that has been memorized, thereby performing hand-off to the second fixed communication apparatus from the first fixed communication apparatus in accordance with the comparison result. By doing so, hand-off can be easily performed to the second fixed communication apparatus while being capable of reducing power consumption during the waiting time.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 2:
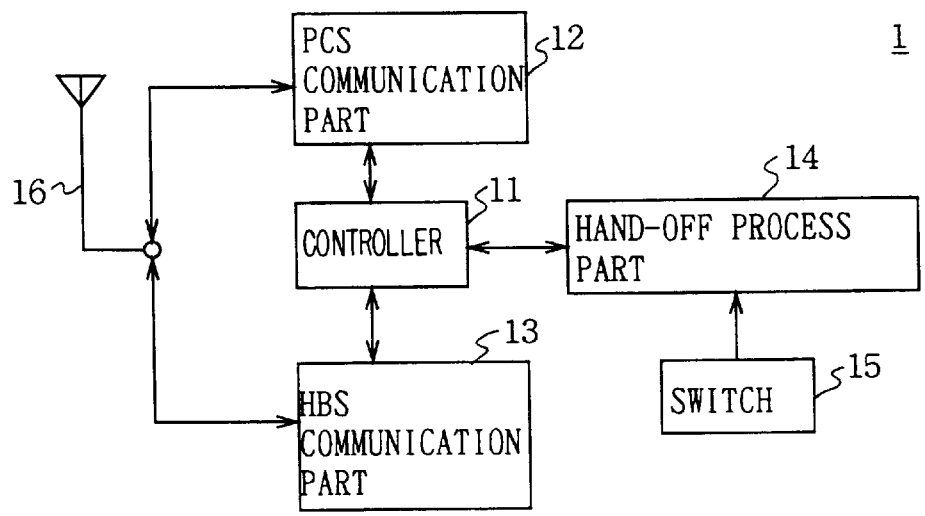
FIG. 2 is a block diagram showing a structure of the conventional PCS terminal equipment.

Preferred embodiments of this invention will be described with reference to the accompanying drawings:
(1) First Embodiment In FIG. 4 where the same reference numerals are applied to parts corresponding to FIG. 2, a PCS terminal equipment 30 applied to this invention is shown. The PCS terminal equipment 30 is roughly comprised of a controller 11, a PCS communication part 12, an HBS communication part 13, an antenna 16 for sending and receiving, and a hand-off process part 31, a memory part 32 and a comparing part 33.

In the beginning, the controller 11 performs overall control with respect to the sending and receiving of information in the same manner as in the prior art. When the PCS terminal equipment 30 communicates with the PCS base station apparatus 2, the controller 11 controls the PCS communication part 12. The PCS communication part 12, which has received the control, performs appropriate sending and receiving process with the PCS base station apparatus 2 via an antenna 16. Furthermore, in the waiting state, the controller 11 regularly activates the PCS communication part 12 so that a received signal from the PCS base station apparatus 2 can be received. In addition, the controller 11 controls the PCS communication part 12 so as to receive an identification signal and an adjacent station signal of the PCS base station apparatus 2 as a station selection signal, the signals are being regularly transmitted from the PCS base station apparatus 2.

On the other hand, when the PCS terminal equipment 30 communicates with the HBS 4, the controller 11 controls the HBS communication part 13. The HBS communication part 13, which has received the control, performs appropriate sending and receiving process with the HBS 4 via the antenna 16. Further, in the waiting state, the controller 11 regularly activates the HBS communication part 13 so that a received signal from the HBS 4 can be received.

The hand-off process part 31 grasps the communication partner which is currently communicating in order to perform a hand-off process in accordance with the signal receiving state which is supplied from the controller 11. Concretely, when a hand-off is performed from the PCS base station apparatus 2 to another PCS base station apparatus 2, the hand-off process part 31 receives the adjacent station signal with the PCS communication part 12 and intermittently examines the signal receiving state of the PCS base station apparatus 2 which is included in the adjacent station signal, in order to transmit the hand-off demand from the PCS communication part 12 in a favorable signal receiving state so as to perform the hand-off.

On the other hand, when the hand-off is performed between the PCS base station apparatus 2 and the HBS 4, the signal receiving state at the hand-off partner is examined when hand-off is performed in advance in the same manner as before in order to perform the hand-off. After the hand-off is performed, the selection signal of the base station is memorized when hand-off is performed, and the signal receiving state at the hand-off partner is examined only in the area where the base station selection signal indicates. By doing so, the signal receiving state at the hand-off partner can be examined only at a position where the hand-off can be performed, with the result that the signal receiving state at the hand-off partner is not required to be examined at random as in the prior art. As a consequence, as compared with the prior art, the frequency of examining the signal receiving state at the hand-off partner is reduced and the power consumption during the waiting time can be reduced.

As a consequence, the PCS terminal equipment 30 is provided with a memory part 32. The PCS terminal equipment 30 is constituted so that the base station selection signal of the PCS base station apparatus 2, output can be memorized when a hand-off is performed that is output from the PCS communication part 12 on the basis of the instruction of the hand-off process part 31. In addition, the PCS terminal equipment 30 is provided with a comparing part 33. It is constituted to judge whether or not the PCS terminal equipment 30 is located at a position where hand-off can be currently performed by comparing the base station selection signal memorized in the memory part 32 with the base station selection signal that is output from the PCS communication part 12 on the basis of the instruction from the hand-off process part 31.

Figure 5:
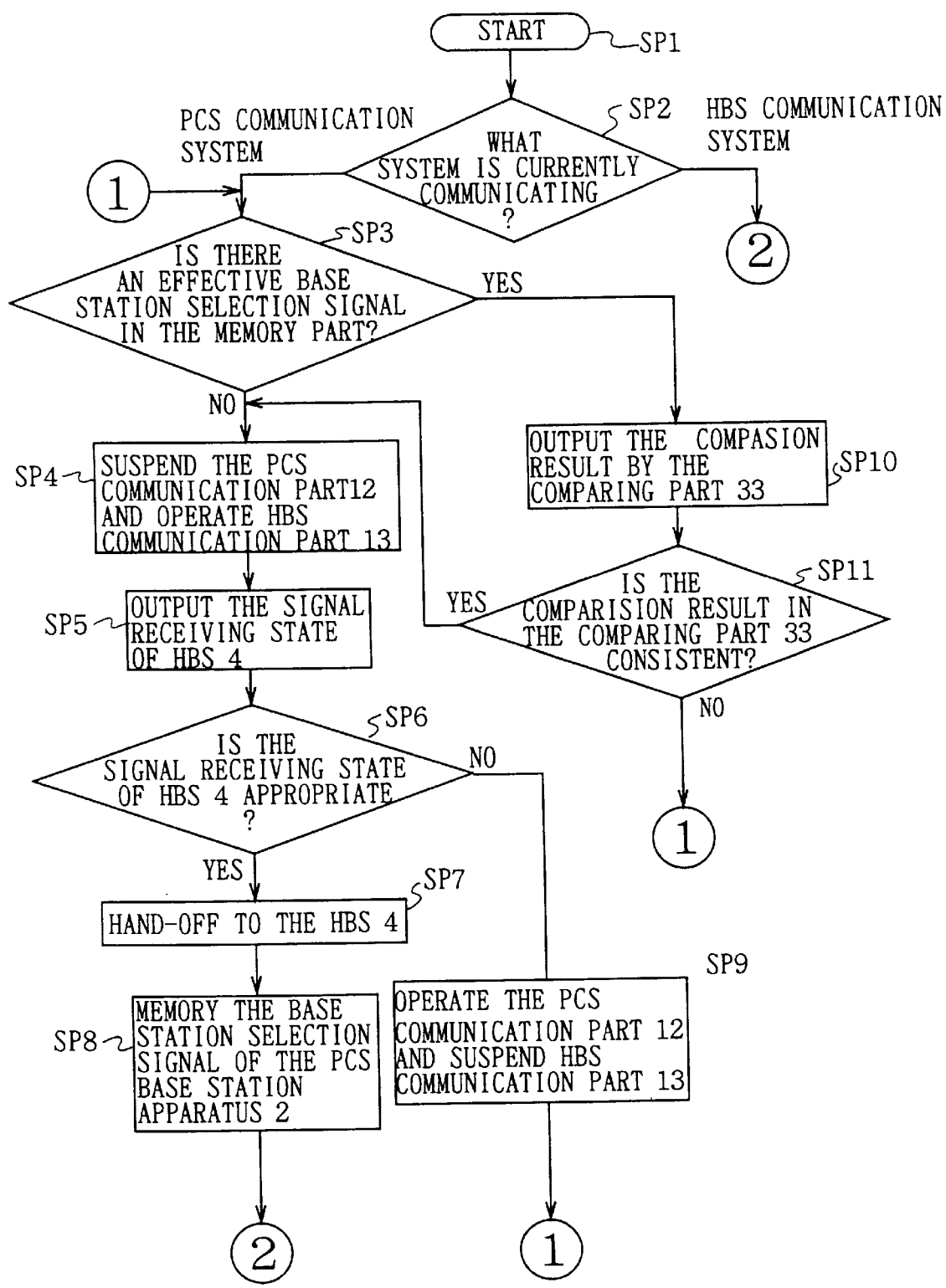
FIGS. 5 and 6 are flowcharts showing a hand-off process between the PCS and the HBS according to the first embodiment.
Figure 6:
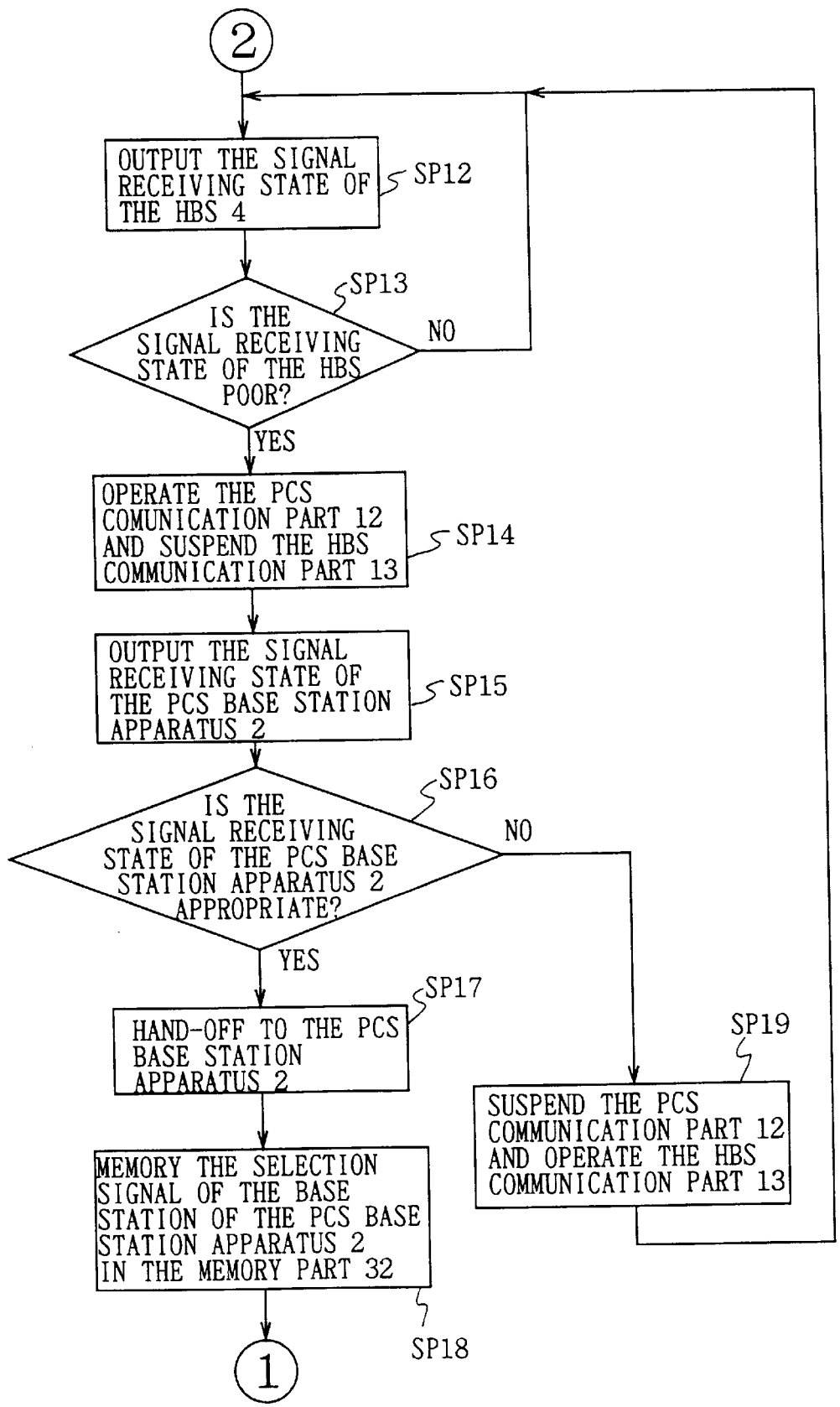

Here, the hand-off process between PCS and HBS in the PCS terminal device 30 will be explained concretely by using a flowchart shown in FIGS. 5 and 6. However, at step SP1, the PCS terminal equipment 30 is set in a waiting state with respect to the PCS base station apparatus 2 or the HBS 4.

In the beginning, starting from step SP1, at step SP2, the hand-off process part 31 judges whether the PCS terminal equipment 30 is currently communicating with the PCS communication system, or the PCS terminal equipment 30 is communicating with the HBS communication system. As a consequence, if the PCS terminal equipment 30 communicates with the PCS communication system, the process proceeds to step SP3, or if the PCS terminal equipment 30 communicates with the HBS communication system, the process proceeds to step SP12.

At step SP3, the hand-off process part 31 examines whether or not an effective base station selection signal has been memorized in the memory part 32. As a consequence, if an effective base station selection signal is memorized, the process proceeds to step SP10. If an effective base station signal has not been memorized, the process proceeds to step SP4. For example, when the power source is turned on for the first time after the PCS terminal equipment 30 has been purchased, or when the hand-off is not performed in advance, the memory part 32 does not memorize an effective base station selection signal, therefore, the process proceeds to step SP4.

At step SP4 to step SP9, the hand-off process part 31 examines the hand-off possibilities to the HBS communication system by monitoring the signal receiving state of the HBS 4, as in the prior art. However, in the case of the embodiment, step SP8 is newly added.

To give a concrete explanation, at step SP4, the hand-off process part 31 suspends the PCS communication part 12 via the controller 11 in order to operate the HBS communication part 13. Next, at step SP5, the hand-off process part 31 allows the HBS communication part 13 to receive the radio wave of the HBS 4 so as to output the received result. The controller 11, which has received the result, provides to the hand-off process part 31 the signal receiving state showing whether the signal of the HBS 4 has been correctly received.

Next, at step SP6, the hand-off process part 31 examines whether the signal receiving state of the HBS 4, which has been received from the controller 11, is within an appropriate range. If the signal receiving state is within an appropriate range, the process proceeds to step SP7 in order to proceed to the hand-off process. If the state is not within an appropriate range, the process proceeds to step SP9. At step SP7, the hand-off process part 31 performs the hand-off from the PCS base station apparatus 2 to the HBS 4 by continuing communication with the HBS 4 to the HBS communication part 13, thereby registers the position with respect to the HBS 4. Next, at step SP8, the hand-off process part 31 memorizes in the memory part 32 the base station selection signal that is received from the PCS base station apparatus 2 immediately before the hand-off. When the above process is completed, the hand-off process part 31 proceeds to step SP12.

On the other hand, when the process proceeds to step SP9 because the signal receiving state is not within an appropriate range, the hand-off process part 31 suspends the HBS communication part 13 via the controller 11 so as to operate the PCS communication part 12 again in order to return to communication with the PCS base station apparatus 2. Once this process is completed, the hand-off process part 31 proceeds to step SP3.

On the other hand, the process between step SP10 and step SP11 after branching off from step SP3 is the process for the case in which an effective base station selection signal has been memorized in the memory part 32. The hand-off process part 31 monitors the signal receiving state of the HBS 4 only at the time when the hand-off process part 31 comes close to the HBS 4. To give a concrete explanation, at step SP10, the hand-off process part 31 gives an instruction to the comparing part 33 to compare the base station selection signal, which is currently output from the PCS communication part 12, with the base station selection signal, which is memorized in the memory part 32, and output the comparison result. Next, at step SP11, the hand-off process part 31 judges whether the comparison result is consistent. If the comparison result is consistent as a result of the comparison, it is judged that the hand-off process part has come close to the HBS 4, and the process proceeds to step SP4 to examine the signal receiving state of the HBS 4. On the contrary, if the comparison result is not consistent, it is judged that the hand-off process part has not come close to the HBS 4, the process proceeds to step SP3 to continue the operation of the PCS communication part 12, and the hand-off is not prepared.

Further, the process between step SP12 and step SP19 after branching off from step SP2 is the process for the case in which the PCS terminal equipment 30 is currently communicating with the HBS 4. To give a concrete explanation, at step SP12, the hand-off process part 31 outputs the received result of the radio wave of the HBS 4 to the HBS communication part 13. The controller 11, which has received the result, provides to the hand-off process part 31 the signal receiving state showing whether the signal of the HBS 4 has been correctly received. Next, at step SP13, the hand-off process part 31 judges whether the signal receiving state of the HBS 4, which has received from the controller 11, is poor or not. As a consequence, if the signal receiving state is so poor that the communication cannot be continued, the process proceeds to step SP14 in order to perform hand-off process. On the contrary, if the signal receiving state is sufficiently favorable, the process returns to step SP12 in order to allow the HBS communication part 13 to continue the communication with the HBS 4, and the hand-off is not prepared.

When the process proceeds to step SP14 because the signal receiving state is poor, the hand-off process part 31 suspends the HBS communication part 13 via the controller 11 so as to operate the PCS communication part 12. Next, at step SP15, the hand-off process part 31 allows the PCS communication part 12 to receive the radio wave of the PCS base station apparatus 2 in order to output the received result. The controller 11, which has received the output result, provides to the hand-off process part 31 the signal receiving state showing whether the signal of the PCS base station apparatus 2 has been correctly received.

Next, at step SP16, the hand-off process part 31 examines whether the signal receiving state of the PCS base station apparatus 2, which has been received from the controller 11, is within an appropriate range. If the signal receiving state is within an appropriate range, the process proceeds to step SP17 to perform hand-off process. On the contrary, if the signal receiving state is not within an appropriate range, the process proceeds to step SP19. At step SP17, the hand-off process part 31 performs a hand-off to the PCS base station apparatus 2 from the HBS 4 by continuing communication with the PCS base station apparatus 2 with respect to the PCS communication part 12, and performs a position registration to the PCS base station apparatus 2. Next, at step SP18, the hand-off process part 31 memorizes in the memory part 32 the base station selection signal which has been received from the PCS base station apparatus 2 immediately after the hand-off. When the process is completed, the hand-off process part 31 proceeds to step SP3.

On the other hand, in the case where the process proceeds to step SP19 because the signal receiving state is not within an appropriate range, the hand-off process part 31 suspends the PCS communication part 12 so as to operate again the HBS communication part 13 in order to return to communication with the HBS 4. Thus, the process proceeds to step SP12. In other words, the hand-off process part 31 intermittently operates the PCS communication part 12 and the HBS communication part 13 alternately to perform hand-off to either of the systems with which information can be appropriately received.

In this manner, the hand-off process part 31 memorizes the base station selection signal in the memory part 32 when the hand-off is performed. When performing hand-off to the HBS 4, the hand-off process part 31 examines the signal receiving state of the HBS 4 and performs hand-off only when the hand-off process part 31 is in the area which is indicated by the base station selection signal memorized in the memory part 32.

In the aforementioned constitution, in the PCS terminal equipment 30 of this embodiment, in the case where a hand-off is performed between the PCS base apparatus 2 and the HBS 4, if hand-off is initially performed, the hand-off is performed after the signal receiving state at the hand-off partner is examined, as in the prior art. After the hand-off is performed once, the base station selection signal at the time of the hand-off is memorized to examine a signal receiving state at the hand-off partner only when the PCS terminal equipment is located in an area which is indicated by the base station selection signal and perform the hand-off.

To give a concrete explanation, in the PCS terminal equipment 30, when hand-off is performed from the PCS base station apparatus 2 to the HBS 4, or when hand-off is performed from the HBS 4 to the PCS base station apparatus 2, the base station selection signal is memorized in the memory part 32. Then when hand-off is performed to the HBS 4 next, it is judged whether or not the PCS terminal equipment 30 has come close to the HBS 4 by comparing the base station selection signal which is newly received with the base station selection signal which has been memorized in the memory part 32. Only in the case where the PCS terminal equipment 30 has come close to the HBS 4 (the case in which there is a possibility of hand-off), the signal receiving state is examined in order to perform a hand-off. Therefore, in the case of the embodiment, the signal receiving state of the HBS 4 is examined only when the PCS terminal equipment 30 comes close to the HBS 4, so that the frequency of examining the signal receiving state of the HBS 4 is reduced as compared with the prior art. In other words, the frequency of operating the HBS communication part 13 is reduced. Consequently, in the case of this embodiment, the power consumption during the waiting time can be reduced and the battery usage time can be prolonged.

In the aforementioned structure, the HBS communication part 13 can be operated only at the time when the PCS terminal equipment comes close to the HBS 4 by providing a memory part 32 for memorizing the base station selection signal when hand-off is performed, a comparing part 33 for comparing the base station selection signal that has been memorized with the base station selection signal that is currently received, and a hand-off process part 31 for performing hand-off by judging that the PCS terminal equipment has come close to the HBS 4 only when the comparison result is consistent and by examining the signal receiving state of the HBS 4, so as to be able to reduce the power consumption at the waiting time.

(2) Second Embodiment

In this embodiment, an error of connecting the PCS terminal equipment to an HBS which is not allowed can be prevented by using an HBS identification signal.

Figure 7:
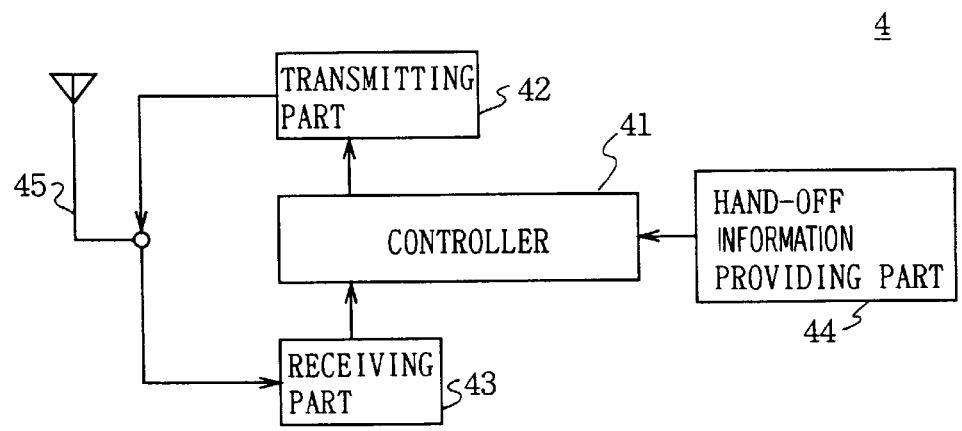
FIG. 7 is a block diagram showing a structure of an HBS according to a second embodiment.

In the beginning, the HBS will be explained by using FIG. 7. As shown in FIG. 7, the HBS 4 is roughly comprised of a controller 41, a transmitting part 42, a receiving part 43, a hand-off information providing part 44, and a sending/receiving antenna 45.

A controller 41 performs overall control with respect to the sending and receiving of information. The transmitting part 42 is operated on the basis of an instruction from the controller 41 so as to transmit information given from the controller 41 to the PCS terminal equipment in an appropriate communication mode.

In addition, the receiving part 43 is operated on the basis of an instruction from the controller 41. The receiving part 43 receives information which is transmitted from the PCS terminal equipment in an appropriate communication mode so as to provide the received information to the controller 41.

The hand-off information providing part 44 holds an identification signal for identifying the HBS 4 to transmit the identification signal via the controller 41 and the transmitting part 42 regularly or in accordance with a demand from the PCS terminal equipment.

Figure 4:
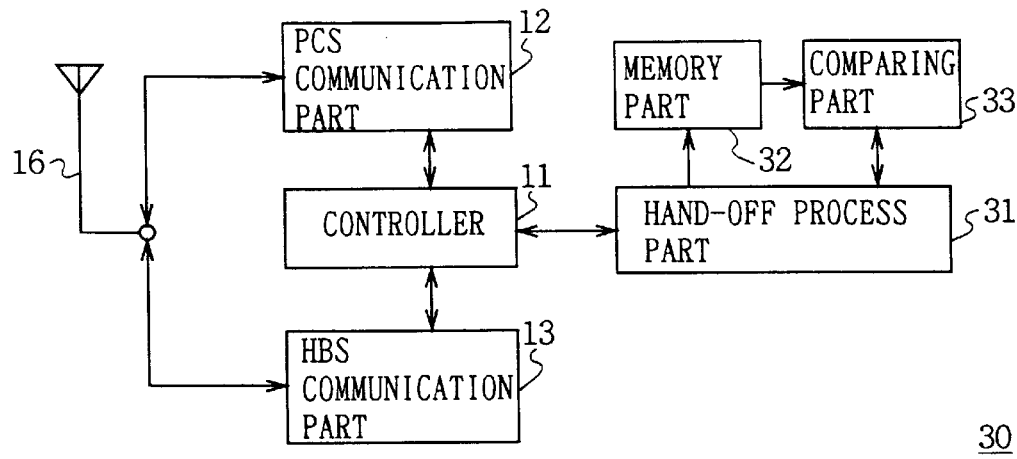
FIG. 4 is a block diagram showing a structure of a PCS terminal equipment according to a first embodiment.
Figure 8:
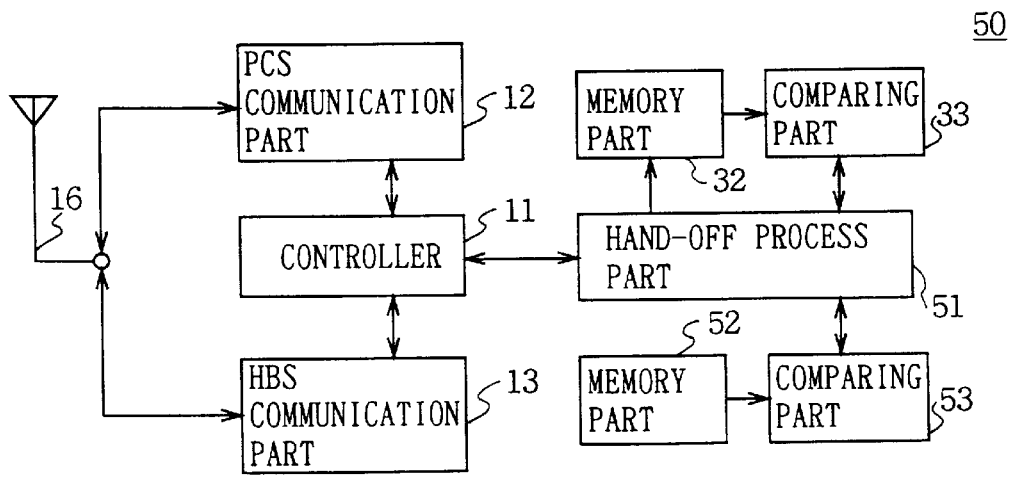
FIG. 8 is a block diagram showing a structure of the PCS terminal equipment according to the second embodiment.

In FIG. 8 where the same reference numerals are applied to parts corresponding to FIG. 4, the PCS terminal equipment according to the embodiment is shown. As shown in FIG. 8, the PCS terminal equipment 50 in this embodiment is constituted almost in the same manner as the PCS terminal equipment 30 according to the first embodiment, except that the memory part 52 and the comparing part 53 are added and that the controlling method of the hand-off process part 51 is different.

The memory part 52 is a memory for memorizing an identification signal of the HBS 4, with which hand-off is allowed; the memory part 52 is constituted so as to memorize the identification signal at the time of manufacture, the sales time, or at the usage starting time. At such a time, as a method for memorizing the identification signal, a method is adopted for inputting and memorizing an identification signal by using input means such as a dial key (not shown) provided on a dedicated identification signal input device and the PCS terminal equipment 50 or for allowing the HBS communication part 13 to receive and memorize the identification signal.

The comparing part 53 is operated on the basis of an instruction from the hand-off process part 51 so as to compare an identification signal of the HBS 4 that is received by the HBS communication part 13 with an identification signal that has been memorized in the memory part 52. The comparison result is output to the hand-off process part 51. The hand-off process part 51 receives the comparison result so as to be able to judge whether or not the HBS 4 which is currently receiving information is allowed to perform the hand-off. The hand-off can be performed only to the HBS 4 which is allowed to perform the hand-off. Thereby, in the case of the embodiment, the hand-off to an HBS 4 to which hand-off is not allowed can be prevented, and illegal use thereof can be prevented in order to heighten the secrecy of conversation on the apparatus.

Figure 9:
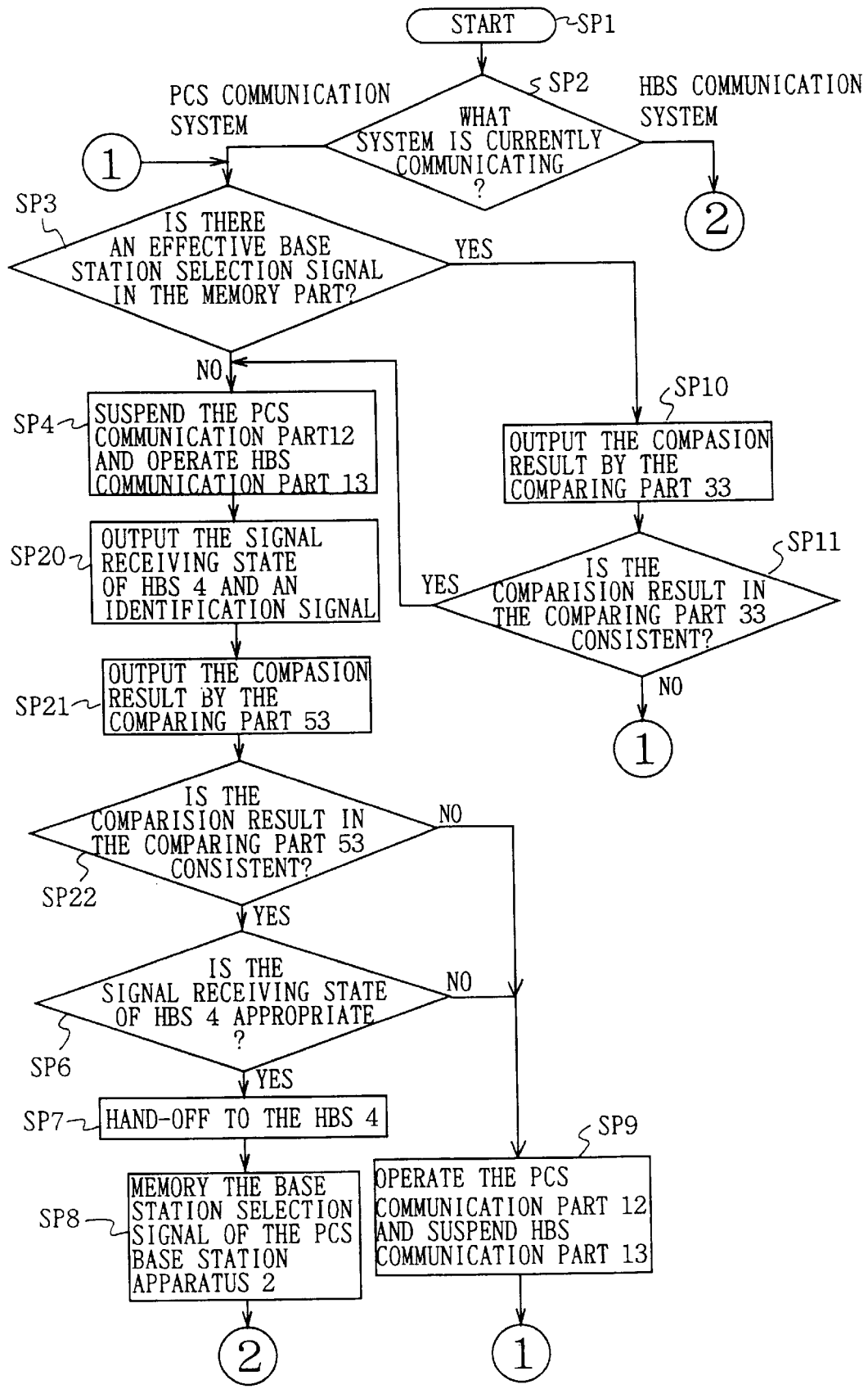
FIGS. 9 and 10 are flowcharts showing a hand-off process between the PCS and the HBS according to the second embodiment.
Figure 10:
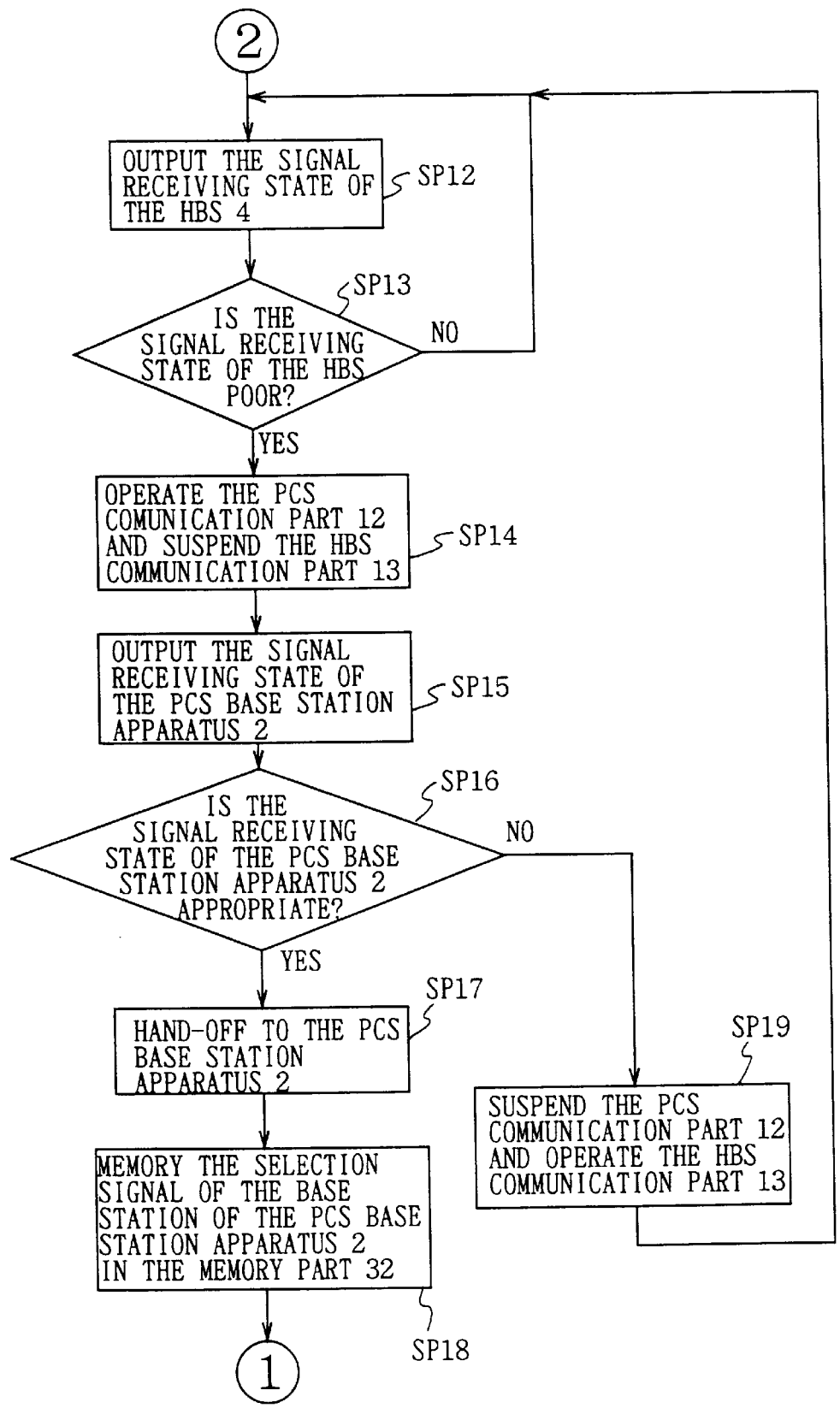

In FIGS. 9 and 10 where the same reference numerals are applied to parts corresponding to FIGS. 5 and 6, the hand-off process between a PCS and an HBS in this embodiment will be explained. As shown from the figures, this embodiment differs from the first embodiment in that steps SP20 to SP22 are provided in the place of step SP5.

In the case of this embodiment, at step SP20, the hand-off process part 51 allows the HBS communication part 13 to receive the radio waves of the HBS 4 in order to output the received result to the controller 11. In addition, the hand-off process part 51 allows the HBS communication part 13 to output an identification signal demand to the HBS 4 in order to output the received identification signal of the HBS 4 as a result to the controller 11. (Otherwise, the hand-off process part 51 allows the HBS communication part 13 to receive the identification signal of the HBS 4 which is regularly transmitted in order to output the received identification signal to the controller 11.) The controller 11, which has received the identification signal, provides the signal receiving state showing whether or not the signal of the HBS 4 can be correctly received as well as the received HBS 4 identification signal to the hand-off process part 51.

Next, at step SP21, the hand-off process part 51 provides an instruction to the comparing part 53 so as to allow the comparing part 53 to compare the received identification signal of the HBS 4 with the identification signal which has been memorized in the memory part 52 in order to output the comparison result. Next, at step SP22, the hand-off process part 51 judges whether or not the comparison result is consistent. As a consequence, if the comparison result is consistent, the hand-off process 51 judges that the hand-off is allowed to proceed to the HBS, so as to proceed to step SP6 in order to perform hand-off. If the result is not consistent, the hand-off process part 51 judges that the hand-off is not allowed to proceed to the HBS, so as to proceed to step SP9 thereby continuing communication with the PCS base station apparatus 2.

In the aforementioned constitution, in this embodiment, an identification signal of the HBS 4 for which hand-off is allowed is memorized in the memory part 52 in advance. Only when the identification signal of the HBS 4 which is received agrees with the identification signal which is memorized in the memory part 52 is the hand-off to the HBS 4 is performed. As a consequence, the hand-off to an HBS 4 which is installed, for example, in a neighboring house can be prevented, and illegal use can be prevented. This embodiment is constituted to confirm the identification signal of the HBS 4 so that a hand-off to an HBS 4 that is not allowed can be prevented and illegal use can be prevented, thereby heightening the secrecy of the conversation.

In the aforementioned constitution, in the embodiment, the hand-off to an HBS 4 for which hand-off is not allowed can be prevented and illegal use can be prevented by providing a memory part 52 in which an identification signal of the HBS 4 to which it is allowed to perform hand-off is memorized, a comparing part 53 for comparing the memorized identification signal with the received identification signal, and a hand-off process part 51 for performing hand-off by judging that the HBS 4 is the one to which it is allowed to perform hand-off when the comparison result is consistent.

(3) Third Embodiment

In the third embodiment, the frequency of examining the signal receiving state of the HBS is reduced by providing information related to the HBS from the PCS base station apparatus, and the power consumption during the waiting time is reduced.

Figure 3:
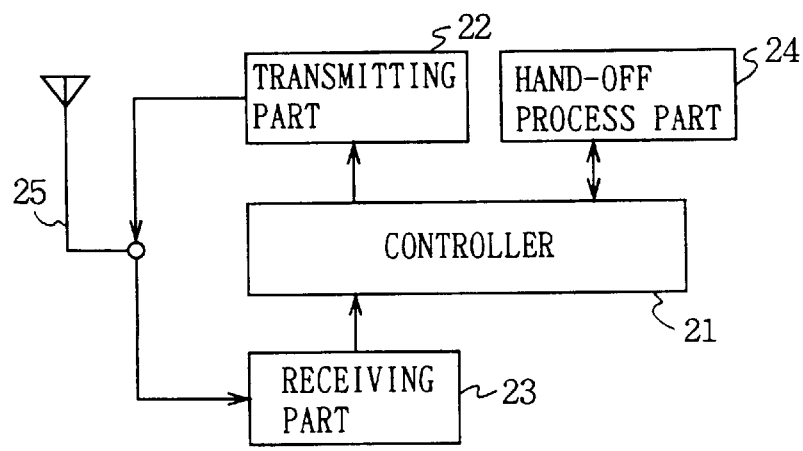
FIG. 3 is a block diagram showing a structure of the conventional PCS base station apparatus.
Figure 11:
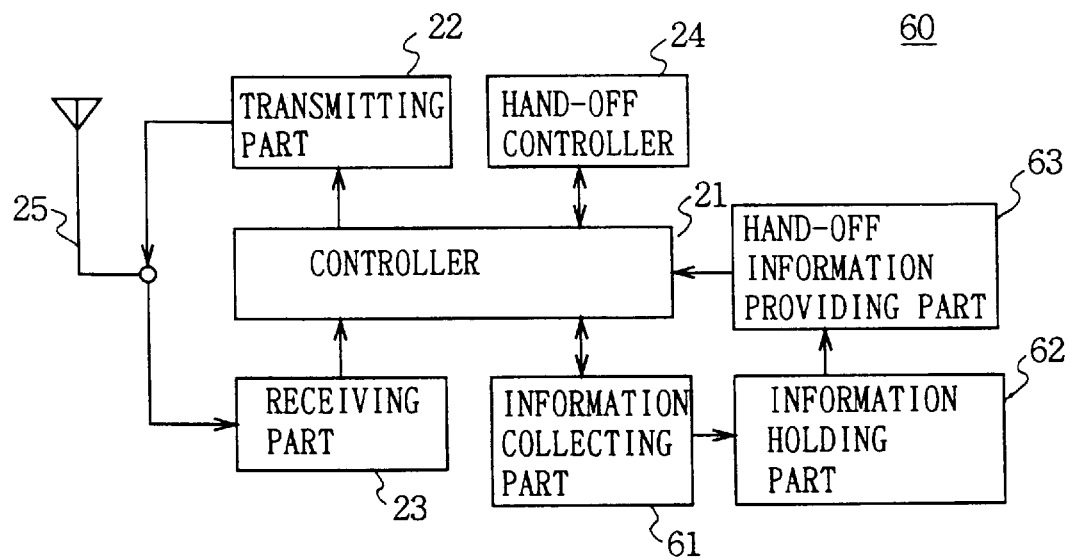
FIG. 11 is a block diagram showing a structure of the PCS base station apparatus according to a third embodiment.

In FIG. 11 where the reference numerals are applied to parts corresponding to FIG. 3, the PCS base station apparatus in the case of the embodiment is shown. As shown in FIG. 11, the PCS base station apparatus 60 is constituted almost in the same manner as the conventional PCS base station apparatus 2 except that the information collecting part 61, the information holding part 62, and a hand-off information providing part 63 are added.

The information collecting part 61 collects identification information for the HBS. As a method for collecting information, various methods can be considered. For example, as a first method, data communication in an appropriate information format is performed with the HBS via a wire telephone circuit to collect identification information for the HBS. In addition, as a second method, a method for transmitting identification information for the HBS is used whereby the user of the HBS sends the information using the telephone or a postcard to the operator of the PCS base station apparatus 60, so that the operator inputs the identification information and thereby receives identification information to collect such information.

However, whatever method is used to collect information, the HBS identification information is provided to all or part of the PCS base station apparatus 60 geographically located at a position where the hand-off can be performed. It is also constituted so that the identification information of the HBS is not provided to the PCS base station apparatuses 60 located at a position where hand-off cannot be performed. In other words, in the case where the position relation of the HBS and the PCS base station apparatus is located in a position shown in FIG. 12, the identification information of the HBS 4 is provided to the PCS base station apparatus 2A, which is located at a position where hand-off can be performed. On the other hand, the identification information of the HBS 4 is not provided to the PCS base station apparatus 2B, which is located at a position where the hand-off cannot be performed.

Incidentally, in the case of this embodiment, since the identification information for the HBS is required, the HBS 4 having a structure shown in FIG. 7 is used as the HBS.

The information holding part 62 holds the identification information of the HBS, which is collected in the information collecting part 61. In addition, the hand-off information providing part 63 reads the identification information of the HBS which is held in the information holding part 62 to regularly provide the information to the controller 21.

The controller 21 provides an identification signal for identifying the PCS base station apparatus 60 as in the prior art, and the adjacent station signal which is an identification signal of the adjacent PCS base station apparatus 60 to the transmitting part 22 to regularly transmit the identification signal and the adjacent station signal. In addition, the controller 21 provides the identification information for the HBS which is received from the hand-off information providing part 63 to the transmitting part 22 so as to regularly transmit the identification information.

Figure 12:
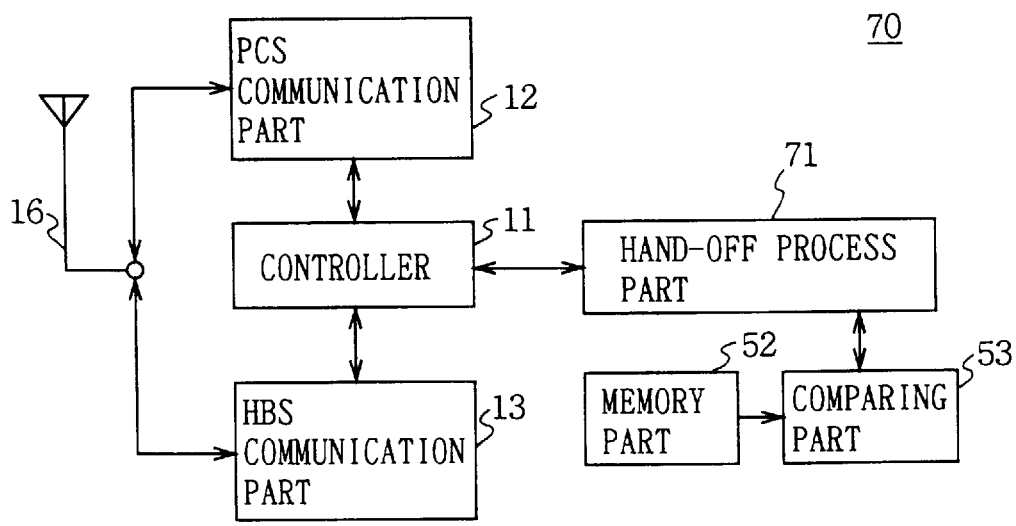
FIG. 12 is a block diagram showing a structure of the PCS terminal equipment according to the third embodiment.

In FIG. 12 where the reference numerals are applied to parts corresponding to FIG. 8, the PCS terminal equipment 70 in this embodiment is shown. As shown in FIG. 12, the PCS terminal equipment 70 in this embodiment is constituted approximately in the same manner as the PCS terminal equipment 50 according to the second embodiment except that the memory part 32 and the comparing part 33 are omitted, and the control method of the hand-off process part 71 is different.

In the case of this embodiment, the PCS terminal equipment 70 preliminarily memorizes in the memory part 52 identification information for the HBS for which hand-off is allowed in order to compare the memorized identification information with the HBS identification information which is received from the PCS base station apparatus 60 in the comparing part 53. Only when the comparison result is consistent does the hand-off process part 71 performs the hand-off process. By doing so, in the PCS terminal equipment 70, the frequency of examining the signal receiving state of the HBS is reduced and the power consumption during the waiting time can be reduced.

Figure 13:
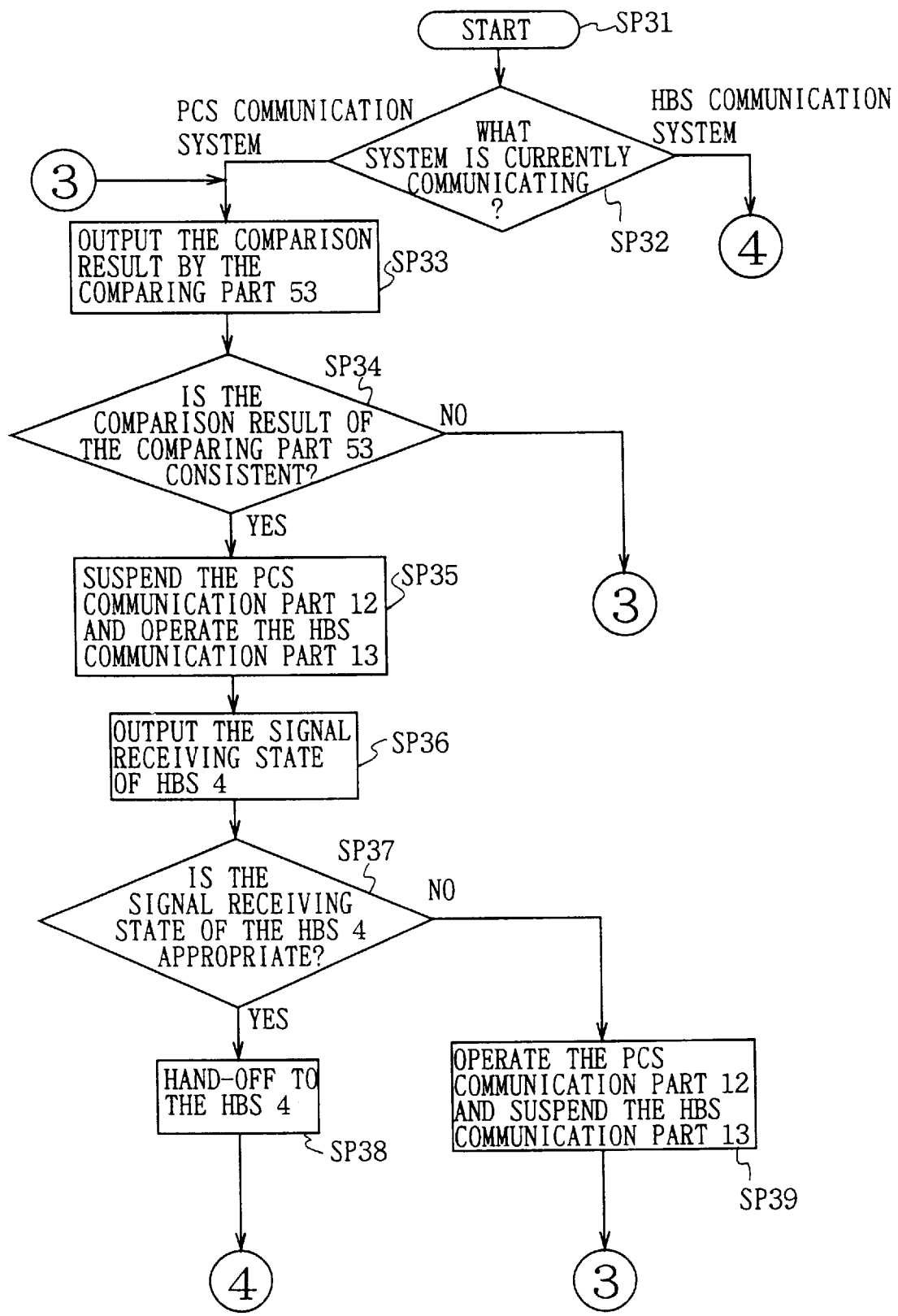
FIGS. 13 and 14 are flowcharts showing a hand-off process between the PCS and the HBS according to the third embodiment.
Figure 14:
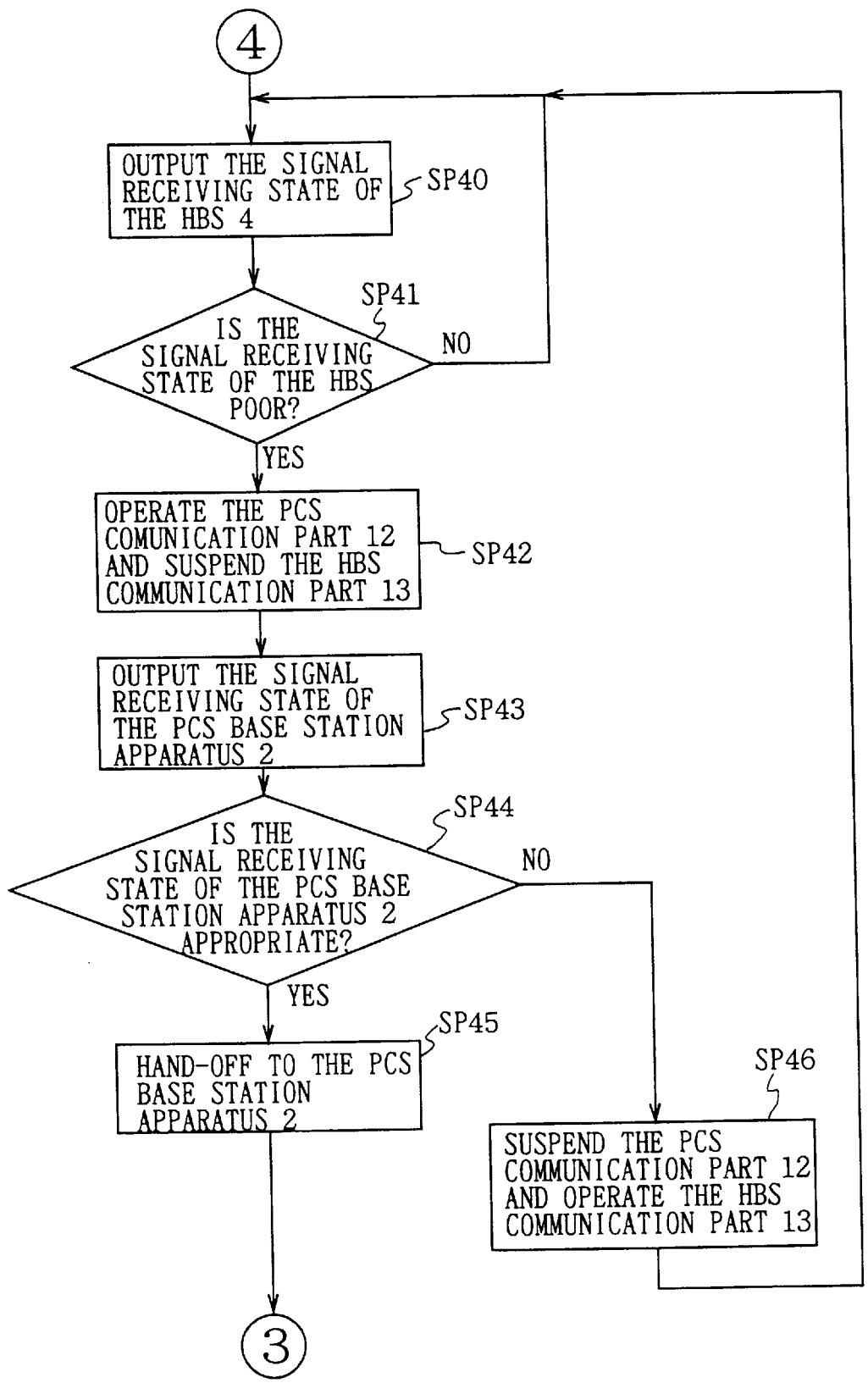

Here, by using the flowchart shown in FIGS. 13 and 14, the hand-off process between PCS and HBS in this PCS terminal equipment 70. In step SP31, the PCS terminal equipment 70 is in the waiting state with respect to the PCS base station apparatus 60 and the HBS 4.

In the beginning, starting from step SP31, at step SP32, the hand-off process part 71 judges whether the PCS terminal equipment 70 is currently communicating with the PCS communication system or with the HBS communication system. As a consequence, when the PCS terminal equipment 70 is communicating with the PCS communication system, the process proceeds to step SP33. On the other hand, when the PCS terminal equipment 70 is communicating with the HBS communication system, the process proceeds to step SP40.

At step SP33, the hand-off process part 71 gives an instruction to the comparing part 53. Then the hand-off process part 71 compares the identification information of HBS 4 which is received from the PCS base station apparatus 60 by the PCS communication part 12 with the identification information of the HBS 4 which has been memorized in the memory part 52 so as to output a comparison result. Next, at step SP34, the hand-off process part 71 judges whether or not the comparison result is consistent or not. As a consequence, if the comparison result is consistent, the hand-off process part 71 judges that the PCS terminal equipment is located at a position approximate to the HBS 4 which is capable of performing the hand-off, and the process proceeds to step SP35 to the hand-off process. If the comparison result is not consistent, the hand-off process part 71 judges that the PCS terminal equipment is not located at a position approximate to the HBS 4 which is capable of performing the hand-off. Then, the process proceeds to step SP33 in order to continue the operation of the PCS communication part 12, and no preparation is made for the hand-off.

At step SP35, the hand-off process part 71 suspends the PCS communication part 12 via the controller 11 so as to operate the HBS communication part 13. Next, at step SP36, the hand-off process part 71 allows the HBS communication part 13 to receive the electric wave of the HBS 4 to output the received result. The controller 11, which has received the result, provides the signal receiving state showing whether or not the signal of the HBS 4 is being correctly received to the hand-off process part 71.

Next, at step SP37, the hand-off process part 71 examines whether or not the signal receiving state of the HBS 4 which is being received from the controller 11 is within an appropriate range or not. If the state is within an appropriate range, the process proceeds to step SP38. If the state is not within an appropriate range, the process proceeds to step SP39. At step SP38, the hand-off process part 71 performs the hand-off from the PCS base station apparatus 60 to the HBS 4 by allowing the HBS communication part 13 to continue communication with the HBS 4, thereby performing position registration to the HBS 4. When this process is ended, the hand-off process part 71 proceeds to step SP40.

On the other hand, when the process proceeds to step SP39 because the signal receiving state is not within an appropriate range, the hand-off process part 71 suspends the HBS communication part 13 via the controller 11 so as to return to communication with the PCS base station apparatus 60 by operating the PCS communication part 12. When this process is completed, the hand-off process part 71 proceeds to step SP33.

On the other hand, after branching off from step SP32, the process from step SP40 to step SP46 is the process for the case in which the PCS terminal equipment 70 is currently communicating with the HBS 4. To specifically explain, at step SP40, the hand-off process part 71 outputs the received result of the radio waves of the HBS 4 to the HBS communication part 13. The controller 11, which has received the received result, provides the signal receiving state of the HBS 4 to the hand-off process part 71. Next, at step SP41, the hand-off process part 71 judges whether or not the signal receiving state of the HBS 4 received from the controller 11 is poor. As a result of the judgment, if the signal receiving state is sufficiently poor so that communication cannot be continued, the process proceeds to step SP42 to proceed the hand-off process. If the signal receiving state is sufficiently good, the process returns to step SP40 to allow the HBS communication part 13 to continue communication with the HBS 4, and no preparation is made for hand-off.

In the case where the process proceeds to step SP42 because the signal receiving state is poor, the hand-off process part 71 suspends the HBS communication part 13 via the controller 11 so as to operate the PCS communication part 12. Next, at step SP43, the hand-off process part 71 allows the PCS communication part 12 to receive the radio wave of the PCS base station apparatus 60 so as to output the received result. The controller 11, which has received the result, provides a signal receiving state showing whether or not the signal of the PCS base station apparatus 60 is being correctly received to the hand-off process part 71.

Next, at step SP44, the hand-off process part 71 examines whether or not the signal receiving state of the PCS base station apparatus 60 received from the controller 11 is within an appropriate range. If the apparatus is within the appropriate range, the process proceeds to step SP45 to proceed the hand-off process. If the apparatus is not within the appropriate range, the process proceeds to step SP46. At step SP45, the hand-off process part 71 performs hand-off from the HBS 4 to the PCS base station apparatus 60 by allowing the PCS communication part 12 to continue communication with the PCS base station apparatus 60, thereby performing position registration to the PCS base station apparatus 60. When this process is completed, the hand-off process part 71 proceeds to step SP33.

On the other hand, if the hand-off process part 71 proceeds to step SP46 because the signal receiving state is not within an appropriate range, the hand-off process part 71 suspends the PCS communication part 12 so as to operate again the HBS communication part 13 in order to return to communication with HBS 4. Then the process proceeds to step SP40.

In the aforementioned structure, in the case of this embodiment, the PCS base station apparatus 60 collects in advance the identification information of the HBS 4 which is located in the vicinity thereof. The collected HBS 4 identification information is regularly transmitted together with the identification signal of its own station and the adjacent station signal.

On the other hand, the PCS terminal equipment 70 memorizes the identification information of the HBS 4 to which the hand-off is allowed in advance in order to compare the memorized identification information with the identification information of the HBS 4 which is received from the PCS base station apparatus 60. When the comparison result is consistent, it is judged that the HBS 4 to which hand-off is allowed is located in the vicinity thereof, and the signal receiving state of the HBS 4 is examined to perform the hand-off. By doing so, in the case of this embodiment, the signal receiving state of the HBS 4 is examined only when the allowed HBS is located in the vicinity, so that the frequency of operating the HBS communication part 13 is reduced as compared with the case wherein the signal receiving state is examined at random as in the prior art. Consequently, in the case of the embodiment, the power consumption during the waiting time can be reduced and the usage time of batteries can be prolonged.

In the aforementioned structure, the identification information of the HBS 4 is regularly transmitted to the PCS base station apparatus 60 by providing an information holding part 62 for memorizing the identification information for the HBS 4 and a hand-off information providing part 63 for regularly transmitting the memorized HBS 4 identification information. The PCS terminal equipment 70 is provided with a memory part 52 for memorizing the identification information for the HBS 4 to which hand-off is allowed, and a comparing part 53 for comparing the memorized identification information with the received identification information to perform the hand-off process only when the comparison result is consistent, with the result that the HBS communication part 13 is operated only when the allowed HBS 4 is located in the vicinity thereof so that the power consumption during the waiting time can be reduced.

(4) Other embodiments

Incidentally, where in the aforesaid first and second embodiments, in the case where the process proceeds from step SP11 to step SP8 via step SP3, the same base station selection signal is overwritten in the memory part 32, however, the present invention is not limited thereto and in the case where the process arrives at step SP8 via such a route, step SP8 can be omitted.

Figure 1:
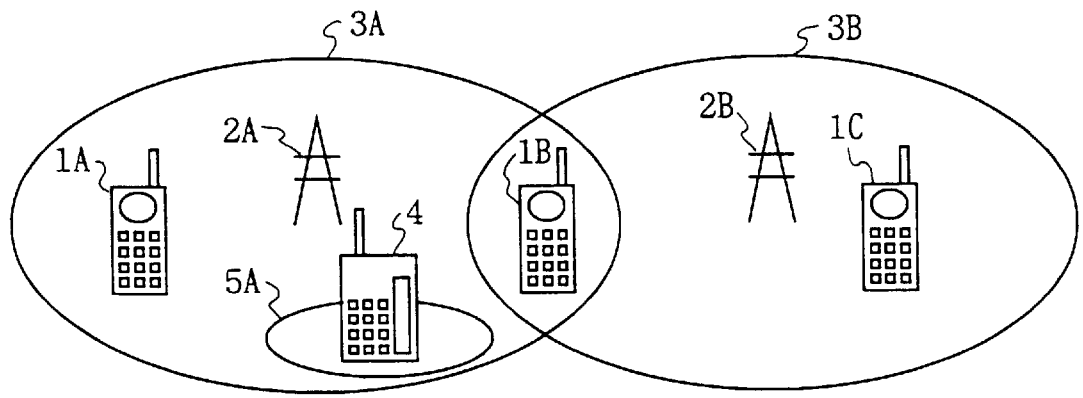
FIG. 1 is a schematic linear view showing an outline of a PCS system.

Further, while in the aforesaid first and second embodiments, the base station selection signal at the time of the hand-off is memorized in the memory part 32. As the base station selection signal which is memorized in the memory part 32, the signal does not always become the base station selection signal of the PCS base station apparatus 2A in which the HBS communication area 5A is included in the service area 3A as shown in FIG. 1. In other words, in the case where the HBS communication area 5A is sufficiently near to the service area 3B, the signal may be the base station selection signal of the PCS base station apparatus 2B. In addition, when the HBS communication area 5A is not included in any of the service areas, the signal may become the base station selection signal of the PCS base station apparatus in the service area which is geographically near to the HBS communication area 5A.

Further, while in the aforesaid first and second embodiments, in the case where the HBS communication area is remote from any of the service areas, the memory part 32 does not memorize anything, however, the present invention is not limited thereto and in such a case, the memory part 32 memorizes a value showing that the value is located out of the service area. Then when the same process is performed as an effective base station selection signal, the signal receiving state of the HBS 4 can be left unexamined during communication with the PCS communication system, with the result that the same advantage can be provided as in the aforementioned description. In other words, in this case, at step SP10 shown in FIGS. 5 and 9, a judgment result can be output such that the base station selection signal is consistent in the case where no signal of the PCS base station apparatus can be received.

Further, while in the aforesaid third embodiment, in the case where the comparison result of the comparing part 53 is consistent, the process proceeds to the hand-off process without fail, however, the present invention is not limited thereto and a process can be added for determining whether or not the hand-off process is performed in accordance with the comparison result after step SP34.

Further, while in the aforesaid embodiment, it has been determined whether or not the hand-off is performed by simply judging whether or not the signal receiving state is appropriate, however the present invention is not limited thereto and Hysteris can be provided in the judgment standard of the signal receiving status. By doing so, frequent hand-offs can be avoided at a boundary between the service area of the PCS base station apparatus and the communication area of the HBS.

Furthermore, while in the aforesaid embodiment, no means is provided for resetting a value which is memorized, particularly in the memory part 32, however, the present invention is not limited thereto and a means for resetting the value in the memory part 32 can be provided. Further the present invention is not limited thereto and a switch for forcing a hand-off can be provided.

Furthermore, while in the aforesaid embodiment, the PCS communication part 12 is provided for communication with the PCS base station apparatus and the HBS communication part 13 for communication with the HBS, however, the present invention is not limited thereto and in the case where the PCS base station apparatus and the HBS use almost the same communication mode, the PCS communication part and the HBS communication part can be constituted with the same circuit to form the two parts into one part.

Furthermore, while in the aforesaid first and second embodiments, the base station selection signal memorized in the memory part 32 is compared with the base station selection signal which is output from the controller 11, however, the present invention is not limited thereto and the identification signal of the PCS base station apparatus can be memorized in the memory part 32 to compare the memorized identification signal with the received identification signal of the PCS base station apparatus. Incidentally, in the embodiment, the identification signal of the PCS base station apparatus is not particularly described. As an identification signal, a bit pattern which is peculiar to each of the PCS base station apparatuses can be used. A transmitting frequency peculiar to each PCS base station apparatus can be used. Otherwise, the transmitting timing peculiar to each of the PCS base station apparatuses can be used. Furthermore, data which represents a distribution code system peculiar to each PCS base station apparatus can be used. In short, as the identification signal, information which is capable of specifying each of the PCS base station apparatus can be used.

For reference, the identification signal of the PCS base station apparatus which is memorized in the memory part 32 is not necessarily limited to one signal. A plurality of signals can be used. In such a case, supposing that three signals at most are to be memorized, signals whose usage frequency is the lowest may be omitted in the case where the number of signals memorized is to exceed three.

Furthermore, while in the aforesaid first and second embodiments, the base station selection signal which is memorized in the memory part 32 is compared with the base station selection signal which is output from the controller 11, however the present invention is not limited thereto and an adjacent station signal of the PCS base station apparatus can be memorized in the memory part 32. Then, the memorized adjacent station signal can be compared with the received adjacent station signal of the PCS base station apparatus so that an examination can be made as to whether at least part of the signals agree with each other. Incidentally, in the embodiment, the adjacent station signal of the PCS base station apparatus is not particularly described. As the adjacent station signal, a bit pattern peculiar to each of the adjacent PCS base station apparatuses can be used. A transmitting frequency peculiar to each adjacent PCS base station apparatus can be used. A transmitting timing peculiar to each adjacent PCS base station apparatus can be used. Furthermore, data showing a distribution code system peculiar to each of the adjacent PCS base station apparatuses can be used. In summary, information for specifying an adjacent PCS base station apparatus can be used as an adjacent station signal.

For reference, the adjacent station signal of the PCS base station apparatus which is memorized in the memory part 32 is not necessarily limited to one signal. A plurality of signals can be used. In such a case, when three signals at most are memorized, signals whose usage frequency is lower can be omitted when the number of signals is to exceed three.

Furthermore, while in the aforesaid second and third embodiments, the identification signal of the HBS is not particularly described. As the identification signal, a bit pattern which is peculiar to each of the HBS's can be used. A transmitting frequency peculiar to each of the HBS's can be used. A transmitting timing peculiar to each of the HBS's can be used. Furthermore, data showing a distribution code system peculiar to each of the HBS's can be used. In summary, information for specifying the HBS can be used as an identification signal.

Moreover, the present invention is not limited thereto and a bit pattern peculiar to each of the PCS terminal equipment can be used as an identification signal for the HBS's. Furthermore, a telephone number which is assigned to each of the PCS terminal equipment can be used. In this case, at the time of manufacture, the sales time or the usage starting time of the PCS terminal equipment, information peculiar to the PCS terminal equipment which allows communication with the HBS can be memorized in the memory part 52 as the identification signal for the HBS.

For reference, the identification signal for the HBS which is memorized in the memory part 52 is not necessarily limited to one. A plurality of signals can be used.

As described above, in accordance with the present invention, at the time hand-off is performed between the first and the second communication apparatuses, a selection signal of the first fixed communication apparatus for selecting the first fixed communication apparatus that is obtained by receiving a signal transmitted from the first fixed communication apparatus is memorized, and the selection signal of the first fixed communication apparatus that has been memorized is compared with the newly received selection signal of the first fixed communication apparatus so that hand-off is performed from the first fixed communication apparatus to the second fixed communication apparatus in accordance with the comparison result thus obtained, with the result that hand-off can be performed easily to the second fixed communication apparatus while being capable of reducing consumed power during the waiting time.

In addition, the selection signal of the second fixed communication apparatus for selecting the second fixed communication apparatus is memorized in advance, and the selection signal of the second fixed communication apparatus that is obtained by receiving the signal transmitted from the second fixed communication apparatus is compared with the selection signal of the second fixed communication apparatus that has been memorized, so that a hand-off is performed from the first fixed communication apparatus to the second fixed communication apparatus in accordance with the comparison result of the second fixed communication apparatus and the comparison result of the selection signal of the first fixed communication apparatus, with the result that a hand-off is prevented to a second fixed communication apparatus to which a hand-off is not allowed.

Moreover, the selection signal of the second fixed communication apparatus is transmitted from the first fixed communication apparatus, the mobile communication apparatus memorizes in advance the selection signal of the second fixed communication apparatus for selecting the second fixed communication apparatus, and the selection signal of the second fixed communication apparatus that is obtained by receiving the signal transmitted from the first fixed communication apparatus is compared with the selection signal of the second fixed communication apparatus that has been memorized so that hand-off is performed in accordance with the comparison result from the first fixed communication apparatus to the second fixed communication apparatus, with the result that hand-off can be easily performed to the second fixed communication apparatus while being capable of reducing the consumed power at the waiting time.

While there has been described in conjunction with the preferred embodiments of the invention, it will be obvious to those skilled in the art that various changes and modifications may be aimed, therefore, to cover in the appended claims all such changes and modifications which may fall within the true spirit and scope of the invention.

What is claimed is:

1. A mobile communication apparatus for constructing a broad-band communication system with a plurality of first fixed communication apparatuses and for constructing a closed-band communication system with a second fixed communication apparatus which is different from said plurality of first fixed communication apparatuses, comprising:

first communication means for communicating with said plurality of first fixed communication apparatuses;

second communication means for communicating with said second fixed communication apparatus;

a first memory for memorizing a selection signal of the plurality of first fixed communication apparatuses for selecting said plurality of first fixed communication apparatuses, said signal being obtained by being received by said first communication means when said signal is transmitted from said plurality of first fixed communication apparatuses when a hand-off is conducted between said plurality of first fixed communication apparatuses and said second fixed communication apparatus;

comparing means for comparing a selection signal and providing a comparison result of said plurality of first fixed communication apparatuses that is memorized in said first memory with a selection signal of said plurality of first fixed communication apparatuses that is newly received by said first communication means; and hand-off process means for conducting a hand-off to said second fixed communication apparatus from said plurality of first fixed communication apparatuses in accordance with the comparison result which is output from said comparing means.

2. The mobile communication apparatus according to claim 1, said apparatus further comprising:
   a second memory for memorizing a selection signal of the second fixed communication apparatus for selecting the second fixed communication apparatus;
   second comparing means for comparing the selection signal and forming a comparison result of said second fixed communication apparatus, said signal being obtained by being received by said second communication means as transmitted from the second fixed communication apparatus, with the selection signal of said second fixed communication apparatus which is memorized in said second memory, wherein said comparing means comprises first comparing means and
   said hand-off process means conducts a hand-off to said second fixed communication apparatus from said plurality of first fixed communication apparatuses in accordance with the comparison result output from said first comparing means and a comparison result output from said second comparing means.

3. The mobile communication apparatus according to claim 2 wherein
   said selection signal of said plurality of first fixed communication apparatuses is an identification signal of a fixed communication apparatus for specifying said plurality of first fixed communication apparatuses.

4. The mobile communication apparatus according to claim 2 wherein
   said selection signal of said second fixed communication apparatus is an identification signal of a fixed communication apparatus for specifying said second fixed communication apparatus.

5. The mobile communication apparatus according to claim 2 wherein
   said selection signal of said second fixed communication apparatus is an identification signal of the mobile communication apparatus for specifying said mobile communication apparatus.

6. The mobile communication apparatus according to claim 2 wherein
   said selection signal of said first fixed communication apparatus is an identification signal of the adjacent fixed communication apparatus for specifying said plurality of first fixed communication apparatuses which is located adjacent to the said plurality of first fixed communication apparatuses.

7. The mobile communication apparatus according to claim 1 wherein
   said selection signal of said plurality of first fixed communication apparatuses is an identification signal of a fixed communication apparatus for specifying said plurality of first fixed communication apparatuses.

8. The mobile communication apparatus according to claim 1 wherein
   said selection signal of said plurality of first fixed communication apparatus is an identification signal of an adjacent fixed communication apparatus for specifying said plurality of first fixed communication apparatuses which is located adjacent to said first fixed communication apparatuses.

9. A mobile communication apparatus for constructing a broad-band communication system with a plurality of first fixed communication apparatuses and constructing a closed-band communication system with a second fixed communication apparatus which is different from the plurality of first fixed communication apparatuses, comprising:
   first communication means for communicating with said plurality of first fixed communication apparatuses;
   second communication means for communicating with said second fixed communication apparatus;
   a memory for memorizing in advance a selection signal of the second fixed communication apparatus for selecting said second fixed communication apparatus;
   comparing means for comparing a signal from said plurality of first fixed communication apparatuses, which is constituted to transmit a selection signal of said second fixed communication apparatus, with a selection signal of said second fixed communication apparatus, which is obtained by being received by said first communication means, and with a selection signal of said second fixed communication apparatus, which is memorized in said memory; and
   a hand-off process means for conducting a hand-off to said second fixed communication apparatus from said first fixed communication apparatuses in accordance with the comparison result which is output from said comparing means.

10. The mobile communication apparatus according to claim 9 wherein
    said selection signal of said second fixed communication apparatus is an identification signal of the fixed communication apparatus for specifying said second fixed communication apparatus.

11. The mobile communication apparatus according to claim 9 wherein
    said selection signal of said second fixed communication apparatus is an identification signal of the mobile communication apparatus for specifying the mobile communication apparatus.

12. A fixed communication apparatus for constructing a broad-band communication system with a plurality of first fixed communication apparatuses and a mobile communication apparatus and for constructing a closed-band communication system with said mobile communication apparatus and a second fixed communication apparatus, wherein said mobile communication apparatus conducts a hand-off between said plurality of first fixed communication apparatuses and between said plurality of first fixed communication apparatus and said second fixed communication apparatus, said plurality of first fixed communication apparatuses comprising:
    a hand-off controller for controlling a hand-off so that said mobile communication apparatus conducts a hand-off between said plurality of first fixed communication apparatuses;
    information holding means for holding a selection signal of the second fixed communication apparatus for selecting the second fixed communication apparatus required when said mobile communication apparatus conducts a hand-off to the second fixed communication apparatus; and
    hand-off information providing means for periodically transmitting a selection signal of said second fixed communication apparatus which is held in said information holding means.

13. The fixed communication apparatus according to claim 12 wherein
    said selection signal of said second fixed communication apparatus is an identification signal of the fixed communication apparatus for specifying said second fixed communication apparatus.

14. The fixed communication apparatus according to claim 12 wherein said selection signal of said second fixed communication apparatus is an identification signal of said mobile communication apparatus for specifying said mobile communication apparatus.

15. A communication system for constructing a broadband communication system with a plurality of first fixed communication apparatuses and a mobile communication apparatus and for constructing a closed-band communication system with said mobile communication apparatus and a second fixed communication apparatus, wherein said mobile communication apparatus, comprising:

first communication means for communicating with said plurality of first fixed communication apparatuses;

second communication means for communicating with said second fixed communication apparatus;

a memory for memorizing a selection signal of said plurality of first fixed communication apparatus for selecting said plurality of first fixed communication apparatus, which is obtained by receiving at said first communication means a signal which is transmitted from said plurality of first fixed communication apparatuses when a hand-off is performed between said plurality of first fixed communication apparatuses and said second fixed communication apparatus;

comparing means for comparing the selection signal and providing a comparison result of said plurality of first fixed communication apparatuses which is memorized in said memory with the selection signal of said plurality of first fixed communication apparatuses which is newly received with said first communication means; and hand-off process means for performing a hand-off to said second fixed communication apparatus from said plurality of first fixed communication apparatuses in accordance with the comparison result which is output from said first comparing means; wherein the hand-off is performed to said second fixed communication apparatus from said plurality of first fixed communication apparatuses.

16. The communication system according to claim 15 wherein said memory comprises a first memory, said comparing means comprises a first comparing means and said mobile communication apparatus further comprises:

a second memory which memorizes in advance a selection signal of said second fixed communication apparatus for selecting said second fixed communication apparatus; and second comparing means for comparing the selection signal and providing a comparison result of said second fixed communication apparatus, said signal being obtained by receiving a signal transmitted from said second fixed communication apparatus by the second communication means using the selection signal of said fixed communication apparatus, which is memorized in said second memory; wherein said hand-off process means performs a hand-off to said second fixed communication apparatus from said plurality of first fixed communication apparatuses in accordance with the comparison result output from said first comparing means and the comparison result output from said second comparing means.

17. A communication system for constructing a broadband communication system with a plurality of first fixed communication apparatuses and a mobile communication apparatus and for constructing a closed-band communication system with said mobile communication apparatus and a second fixed communication apparatus, wherein said plurality of first fixed communication apparatuses comprises:

hand-off information providing means for transmitting a selection signal of said second fixed communication apparatus for selecting said second fixed communication apparatus; and said mobile communication apparatus comprises:

first communication means for communicating with said plurality of first fixed communication apparatuses;

second communication means for communicating with said second fixed communication apparatus;

a memory for memorizing in advance the selection signal of said second fixed communication apparatus for selecting said second fixed communication apparatus;

comparing means for comparing the selection signal and providing a comparison result of said second fixed communication apparatus obtained by receiving a signal transmitted from said plurality of first fixed communication apparatuses at said first communication means with the selection signal of said second fixed communication apparatus, which signal is memorized in said memory; and hand-off process means for performing a hand-off to the second fixed communication apparatus from said plurality of first fixed communication apparatuses in accordance with the comparison result output from said comparing means, wherein a hand-off is performed to said second fixed communication apparatus from said plurality of first fixed communication apparatuses.

18. A communication method for constructing a broadband communication system with a plurality of first fixed communication apparatuses and a mobile communication apparatus and for constructing a closed-band communication system with said mobile communication apparatus and a second fixed communication apparatus, wherein in said mobile communication apparatus, said method comprises the steps of:

memorizing a selection signal of said plurality of first fixed communication apparatuses for selecting said plurality of first fixed communication apparatuses, said selection signal being obtained by receiving a signal transmitted from said plurality of first fixed communication apparatuses when a hand-off is performed between said plurality of first fixed communication apparatuses and second fixed communication apparatus;

comparing the selection signal and providing a comparison result of said first fixed communication apparatus that has been memorized with the selection signal of said first fixed communication apparatus that is newly received; and performing a hand-off to said second fixed communication apparatus from said plurality of first fixed communication apparatuses in accordance with the comparison result thus obtained.

19. The communication method according to claim 18 wherein in said mobile communication apparatus, said method comprises the steps of:

memorizing in advance a selection signal of the second fixed communication apparatus for selecting said second fixed communication apparatus;

comparing the selection signal of said second fixed communication apparatus that is obtained by receiving a signal transmitted from said second fixed communication apparatus with the selection signal of said second fixed communication apparatus that has been memorized and providing a comparison result; and performing a hand-off to said second fixed communication apparatus from said first fixed communication apparatus in accordance with the comparison result obtained and the comparison result of the selection signal of said plurality of first fixed communication apparatuses.

20. A communication method for constructing a broadband communication system with a plurality of first fixed communication apparatuses and a mobile communication apparatus and for constructing a closed communication system with said mobile communication apparatus and a second fixed communication apparatus, wherein in said mobile communication apparatus, said method comprises the steps of:

memorizing in advance a selection signal of the second fixed communication apparatus for selecting said second fixed communication apparatus;

comparing said selection signal and providing a comparison result of said second fixed communication apparatus obtained by receiving a signal from said plurality of first fixed communication apparatuses, which is constructed for transmitting the selection signal of said second fixed communication apparatus, with said selection signal of said second fixed communication apparatus which has been memorized; and performing a hand-off from said plurality of first fixed communication apparatus to said second fixed communication apparatuses in accordance with the comparison result obtained.

* * * * *